US008977481B1

(12) United States Patent
Downs

(10) Patent No.: US 8,977,481 B1
(45) Date of Patent: Mar. 10, 2015

(54) UNMANNED AIRCRAFT NAVIGATION SYSTEM

(75) Inventor: Joshua Lee Downs, Auburn, WA (US)

(73) Assignee: The Boeing Company, Chicago, IL (US)

( * ) Notice: Subject to any disclaimer, the term of this patent is extended or adjusted under 35 U.S.C. 154(b) by 165 days.

(21) Appl. No.: 13/460,619

(22) Filed: Apr. 30, 2012

(51) Int. Cl.
*G06F 19/00* (2011.01)
*G08G 5/00* (2006.01)

(52) U.S. Cl.
CPC ............ *G08G 5/0017* (2013.01); *G08G 5/0013* (2013.01); *G08G 5/0043* (2013.01)
USPC .......................................................... 701/120

(58) Field of Classification Search
CPC .. G08G 5/0082; G08G 5/0013; G08G 5/0043
USPC .................. 701/120, 300–301, 458; 340/903; 342/455
See application file for complete search history.

(56) References Cited

U.S. PATENT DOCUMENTS 5,714,948 A * 2/1998 Farmakis et al. ............. 340/961
6,934,608 B2 8/2005 Qureshi
7,706,979 B1 * 4/2010 Herwitz ........................ 701/301
8,781,650 B2 * 7/2014 Downs .............................. 701/3
2009/0125221 A1 * 5/2009 Estkowski et al. ............ 701/120
2011/0208374 A1 8/2011 Jayathirtha et al.
2011/0246002 A1 * 10/2011 Shavit ............................. 701/14
2011/0301842 A1 * 12/2011 Krupansky et al. ........... 701/206

OTHER PUBLICATIONS

Cummings et al., "Operator Scheduling Strategies in Supervisory Control of Multiple UAVs", Aerospace Science and Technology, vol. 11, No. 4, May 2007, 27 Pages.
Cummings et al., "Managing Multiple UAVs through a Timeline Display", Paper presented at the AIAA InfoTech, Arlington, VA, Sep. 2005, 13 Pages.
SAE ARP5628: Final Approach Spacing System (FASS), S-7 Flight Deck Handling Qualities Stds for Trans Aircraft, Nov. 2005, 14 Pages.

* cited by examiner

*Primary Examiner* — Helal A Algahaim
*Assistant Examiner* — Nga X Nguyen
(74) *Attorney, Agent, or Firm* — Yee & Associates, P.C.

(57) ABSTRACT

A method and apparatus for assisting in management of a number of unmanned aerial vehicles. Symbols used to display a number of pre-planned routes for the number of unmanned aerial vehicles are identified on a top-down view of the number of pre-planned routes. Flight information with respect to time for the number of unmanned aerial vehicles on a number of timelines is displayed using the symbols identified as being used to display the number of pre-planned routes for the number of unmanned aerial vehicles on the top-down view of the number of pre-planned routes.

19 Claims, 10 Drawing Sheets

UNMANNED AIRCRAFT NAVIGATION SYSTEM

BACKGROUND INFORMATION

1. Field

The present disclosure relates generally to aircraft and, in particular, to displaying information used to control the movement of aircraft. Still more particularly, the present disclosure relates to a method and apparatus for displaying information for controlling the movement of unmanned aerial vehicles.

2. Background

Many aircraft have navigation displays for displaying information used to operate an aircraft. These navigation displays may display maps to an operator of the aircraft for use in operating the aircraft. These maps may include information, such as terrain, weather, airspace geometry, navigation aids, wind, routes, direction of travel, and other types of information. These types of displays are typically in the form of a map displayed in a top-down view. An icon representing the aircraft is typically displayed on a map in a location representing the current location of the aircraft.

Operators of an aircraft may also use other types of displays in a navigation system. For example, the operator may use a vertical situation profile display. This type of display may include information about terrain, attitude, and other information with respect to the aircraft. An icon representing the aircraft is displayed in a vertical position on the map indicating the altitude of the aircraft. Further, terrain ahead of the direction of travel of the aircraft also may be displayed on a vertical situation profile display.

Operators may also operate multiple aircraft using navigation displays. For example, the operator may be an air traffic control system operator managing multiple aircraft. In another instance, the operator may operate multiple unmanned aerial vehicles (UAVs).

When an operator manages multiple aircraft, such as unmanned aerial vehicles, displaying the route of the aircraft may not be as useful as desired in a top-down or vertical situation profile view. For example, unmanned aerial vehicles may have pre-planned routes. These pre-planned routes may be displayed on a top-down view of the unmanned aerial vehicles. The routes may overlap on this view of the unmanned aerial vehicles in some cases.

With this top-down view, an operator, however, may not know whether the overlap occurs at the same point in time. As a result, the display of routes for multiple unmanned aerial vehicles may not be as useful as desired for an operator of the unmanned aerial vehicles. Therefore, it would be desirable to have a method and apparatus that takes into account at least some of the issues discussed above as well as other possible issues.

SUMMARY

In one illustrative embodiment, a method for assisting in management of a number of unmanned aerial vehicles is present. Symbols used to display a number of pre-planned routes for the number of unmanned aerial vehicles are identified on a top-down view of the number of pre-planned routes. Flight information with respect to time for the number of unmanned aerial vehicles on a number of timelines is displayed using the symbols identified as being used to display the number of pre-planned routes for the number of unmanned aerial vehicles on the top-down view of the number of pre-planned routes.

In another illustrative embodiment, a method for displaying information for operating an aircraft is present. Symbols used to display a pre-planned route for the aircraft are identified on a top-down view of the pre-planned route. Flight information with respect to time for the aircraft is displayed on a timeline using the symbols identified as being used to display the pre-planned route for the aircraft on the top-down view.

In yet another illustrative embodiment, an apparatus comprises a display system and a navigation system. The navigation system is configured to identify symbols used to display a number of pre-planned routes for a number of unmanned aerial vehicles on a top-down view of the number of pre-planned routes. The navigation system is further configured to display flight information with respect to time for the number of unmanned aerial vehicles on a number of timelines using the symbols identified as being used to display the number of pre-planned routes for the number of unmanned aerial vehicles on the top-down view of the number of pre-planned routes.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that one manner in which information may be displayed to an operator is through the use of timelines. A timeline may be displayed in which events are shown with respect to spatial and temporal locations on a timeline. In other words, spatial information, such as altitudes, and temporal information, such as when events occur, are displayed on a timeline.

The illustrative embodiments recognize and take into account that although these timelines may provide information in a form that is more desirable for use in managing the operation of aircraft, such as unmanned aerial vehicles, these timelines may not be as easy to understand as desired.

The illustrative embodiments recognize and take into account that currently used timelines use symbols specifically generated to represent events or distances on the timeline. The illustrative embodiments recognize and take into account that the use of a timeline by itself may not provide as much information as desired for managing the operation of multiple unmanned aerial vehicles. As a result, an operator may use a top-down view with a timeline.

The illustrative embodiments recognize and take into account that the differences in the types of symbols may make using both a top-down view and a timeline more difficult than desired. An operator mentally correlates the symbols used in the top-down view with the symbols used on the timeline. This type of correlation takes time and concentration. The illustrative embodiments recognize and take into account that learning newer or different symbols from those typically used in a top-down view may require more time and effort than desired. Thus, the illustrative embodiments provide a method and apparatus for assisting in the management of a number of unmanned aerial vehicles.

Figure 1:
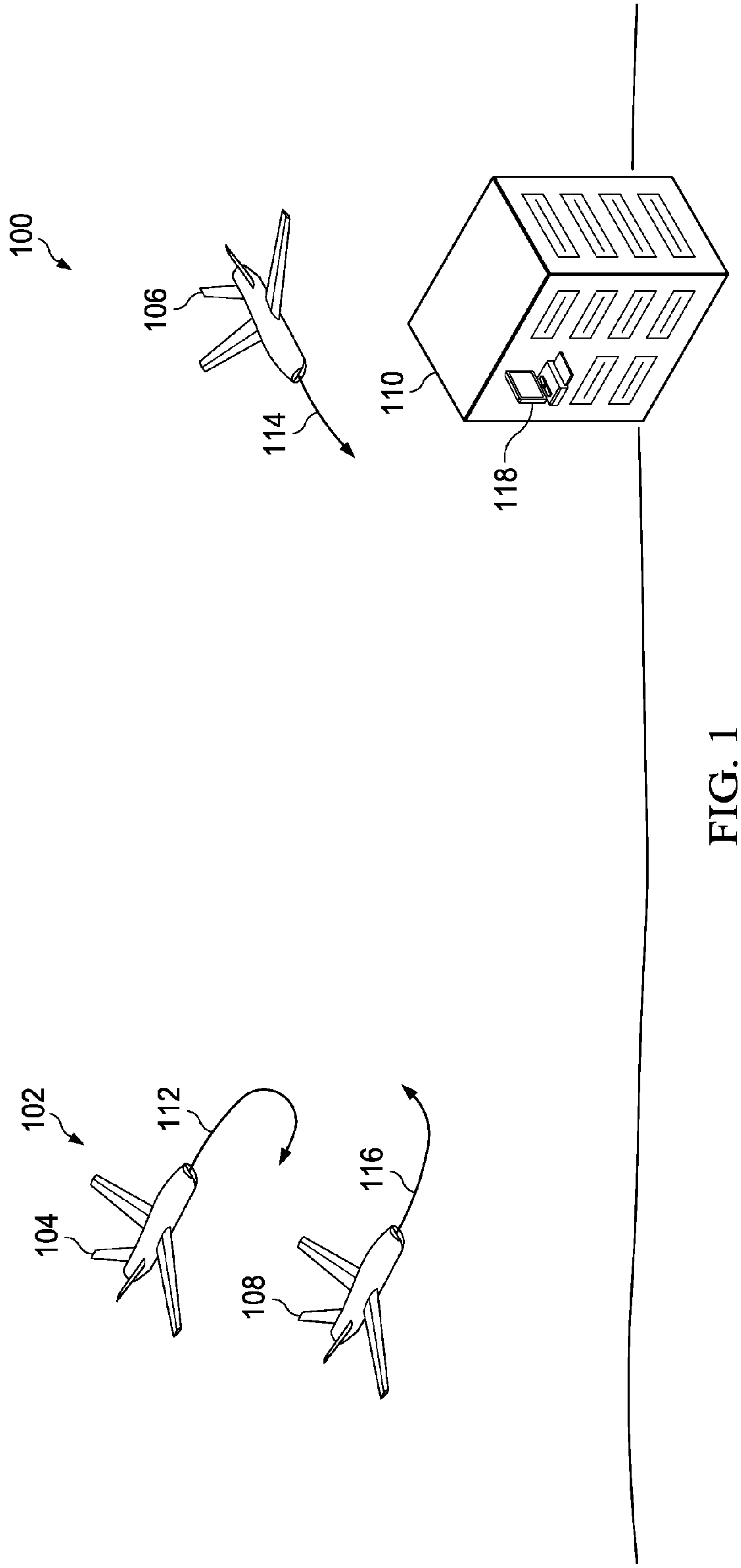
FIG. 1 is an illustration of an aircraft environment in accordance with an illustrative embodiment.

With reference now to the figures and, in particular, with reference to FIG. 1, an illustration of an aircraft environment is depicted in accordance with an illustrative embodiment. In this illustrative example, aircraft environment 100 includes aircraft in the form of unmanned aerial vehicles 102. As depicted, unmanned aerial vehicles 102 include unmanned aerial vehicle 104, unmanned aerial vehicle 106, and unmanned aerial vehicle 108.

In these illustrative examples, unmanned aerial vehicles 102 are managed by an operator at ground station 110. Unmanned aerial vehicles 102 may have pre-planned routes. For example, unmanned aerial vehicle 104 may fly on pre-planned route 112, unmanned aerial vehicle 106 may fly on pre-planned route 114, and unmanned aerial vehicle 108 may fly on pre-planned route 116.

In managing unmanned aerial vehicles 102, the operator may need to visualize these routes. For example, unmanned aerial vehicle 104 may fly closer than desired to unmanned aerial vehicle 108 while unmanned aerial vehicles 102 fly on the pre-planned routes. The operator may employ navigation system 118 to view flight information about the pre-planned routes for unmanned aerial vehicles 102.

If the operator feels that unmanned aerial vehicle 104 may fly closer than desired to unmanned aerial vehicle 108, the operator at ground station 110 may make adjustments to the pre-planned routes of either unmanned aerial vehicle 104 or unmanned aerial vehicle 108 when the operator is aware of such a situation. In the illustrative examples, an illustrative embodiment may be implemented at ground station 110 to assist the operator in managing operation of unmanned aerial vehicles 102.

For example, in the illustrative embodiments, symbols used to display pre-planned routes for unmanned aerial vehicles 102 on a top-down view of the pre-planned routes are identified by navigation system 118. Further, navigation system 118 displays flight information with respect to time for unmanned aerial vehicles 102 on timelines in a timeline view. The timeline view provides a different view of the flight information and may be used in conjunction with the top-down view to manage unmanned aerial vehicles 102.

In the illustrative embodiments, the flight information is displayed on timelines in the timeline view using the symbols identified as being used to display the pre-planned routes for unmanned aerial vehicles 102 on the top-down view of the pre-planned routes. The use of the common symbols between the two views aids in linking information between the two views in the illustrative embodiments.

These timelines may be used to determine, for example, whether unmanned aerial vehicle 104 may fly too close to unmanned aerial vehicle 108 during flight along the pre-planned routes. In this manner, the operator at ground station 110 may be provided with greater situation awareness for managing unmanned aerial vehicles 102. With the use of common symbols between the top-down view and the timeline view, the operator may more easily comprehend flight information displayed in the top-down view and the timeline view.

Figure 2:
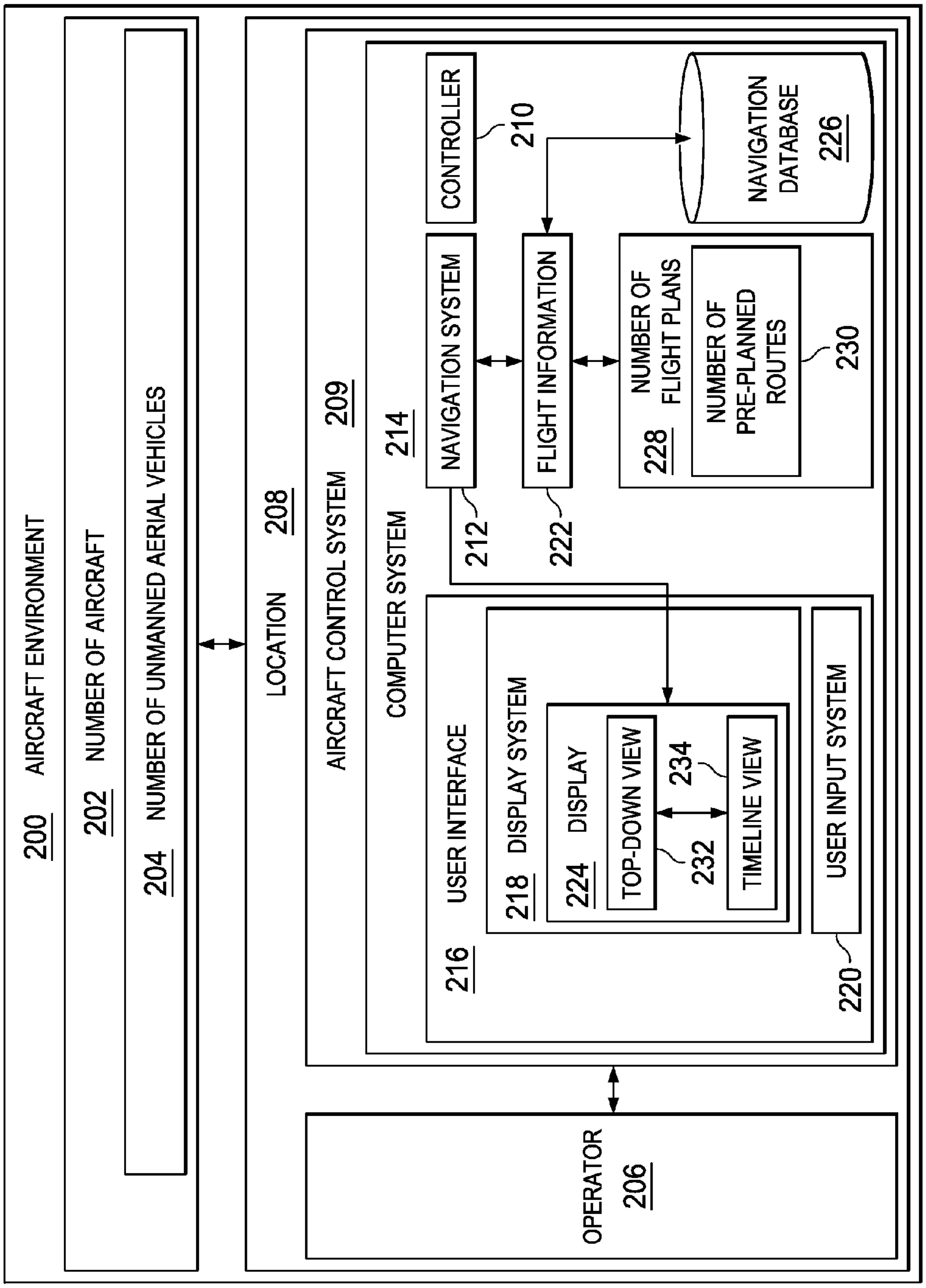
FIG. 2 is an illustration of a block diagram of an aircraft environment in accordance with an illustrative embodiment.

With reference now to FIG. 2, an illustration of a block diagram of an aircraft environment is depicted in accordance with an illustrative embodiment. In this illustrative example, aircraft environment 100 in FIG. 1 is an example of one implementation for aircraft environment 200 shown in block form in this figure.

Aircraft environment 200 includes number of aircraft 202. As used herein, a "number of", when used with reference to items, means one or more items. For example, number of aircraft 202 is one or more aircraft. In this illustrative example, number of aircraft 202 takes the form of number of unmanned aerial vehicles 204.

Operator 206 at location 208 manages the operation of number of unmanned aerial vehicles 204 from location 208. Location 208 may be, for example, without limitation, a ground location, an aircraft, a ship, or some other suitable location.

As depicted, operator 206 manages the operation of number of aircraft 202 using aircraft control system 209. Aircraft control system 209 includes controller 210 and navigation system 212.

As depicted, controller 210 is configured to control the operation of number of unmanned aerial vehicles 204. Operator 206 obtains information to manage number of unmanned aerial vehicles 204 through navigation system 212.

In these illustrative examples, controller 210 and navigation system 212 in aircraft control system 209 may be implemented in computer system 214. Computer system 214 may be a number of computers. When more than one computer is present, those computers may be in communication with each other through a communications medium, such as a network.

Controller 210 and navigation system 212 may be implemented in software, hardware, or a combination of the two. When software is used, the operations performed by the components may be implemented in the program code configured to be run on a processor unit. When hardware is employed, the hardware may include circuits that operate to perform the operations in the components.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or comprised entirely of organic components excluding a human being. For example, the processes may be implemented as circuits in organic semiconductors.

In this illustrative example, operator 206 may interact with controller 210 and navigation system 212 through user interface 216. User interface 216 is hardware and may also include software. User interface 216 includes display system 218 and user input system 220 in this depicted example. Display system 218 is one or more display devices. These display devices may include, for example, without limitation, at least one of a liquid crystal display, a plasma display, and other suitable types of displays. User input system 220 is one or more user input devices. These user input devices may be, for example, without limitation, at least one of a touch screen, a physical button, a keyboard, a mouse, and other suitable types of input devices.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

As depicted, navigation system 212 may provide flight information 222 for number of unmanned aerial vehicles 204 to operator 206. This flight information may be displayed in display 224 in display system 218. Flight information 222 is configured to be displayed in display 224 in a manner that provides operator 206 with a desired level of situation awareness with respect to the movement of number of unmanned aerial vehicles 204. In these illustrative examples, flight information 222 may be routing information or other information for number of unmanned aerial vehicles 204.

In these illustrative examples, display 224 is generated by navigation system 212. In generating display 224, navigation system 212 may use navigation database 226 and number of flight plans 228 for number of unmanned aerial vehicles 204. Number of flight plans 228 may include number of pre-planned routes 230 for number of unmanned aerial vehicles 204.

In this illustrative example, flight information 222 in display 224 may include at least one of top-down view 232 and timeline view 234. In this illustrative example, top-down view 232 and timeline view 234 include flight information 222. In particular, top-down view 232 provides a spatial view of flight information 222. Timeline view 234 provides a temporal view of flight information 222. Flight information 222 is based on number of pre-planned routes 230 for number of unmanned aerial vehicles 204 in number of flight plans 228. In these illustrative examples, top-down view 232 and timeline view 234 may display some of the same flight information in flight information 222 and also may display different portions of flight information 222 from each other. In other words, timeline view 234 may display some information not shown in top-down view 232 in these illustrative examples.

Top-down view 232 and timeline view 234 are linked to each other. Linking displaying of flight information 222 with respect to time for number of unmanned aerial vehicles 204 in timeline view 234 with displaying top-down view 232 occurs such that changes in number of pre-planned routes 230 displayed in top-down view 232 are reflected in timeline view 234. For example, operator 206 may change number of pre-planned routes 230. Additionally, the progress of number of unmanned aerial vehicles 204 along number of pre-planned routes 230 in top-down view 232 also may be reflected in timeline view 234.

Further, the linking of top-down view 232 and timeline view 234 also occurs in a manner that allows operator 206 to transition between the two views with a desired level of speed and concentration. In these illustrative examples, symbols may be used to link these two views to each other. For example, symbols in top-down view 232 are also used in timeline view 234. In particular, symbols used with respect to displaying flight information 222 for number of pre-planned routes 230 in top-down view 232 are reused in displaying flight information 222 for number of pre-planned routes 230 in timeline view 234.

With timeline view 234, operator 206 may be able to determine whether an incursion may occur between unmanned aerial vehicles in number of unmanned aerial vehicles 204 as they fly along number of pre-planned routes 230. In these illustrative examples, an incursion may occur when two or more unmanned aerial vehicles fly too closely to each other. If operator 206 identifies an incursion on timeline view 234, operator 206 may make adjustments to number of pre-planned routes 230 for number of unmanned aerial vehicles 204. The incursion on timeline view 234 is a potential incursion if the unmanned aerial vehicles will likely fly closer to each other than desired if the unmanned aerial vehicles continue to operate without changes to number of pre-planned routes 230.

Through the use of the same symbols in both top-down view 232 and timeline view 234, less time, concentration, and experience may be needed to use flight information 222 in timeline view 234 by operator 206 as compared to other timelines. As a result, operator 206 may be able to more efficiently manage number of unmanned aerial vehicles 204. For example, with navigation system 212 and the use of timeline view 234 in which symbols used are common to both top-down view 232 and timeline view 234, operator 206 also may be able to manage greater numbers of unmanned aerial vehicles. For example, the management may be separation management of greater numbers of unmanned aerial vehicles.

Figure 3:
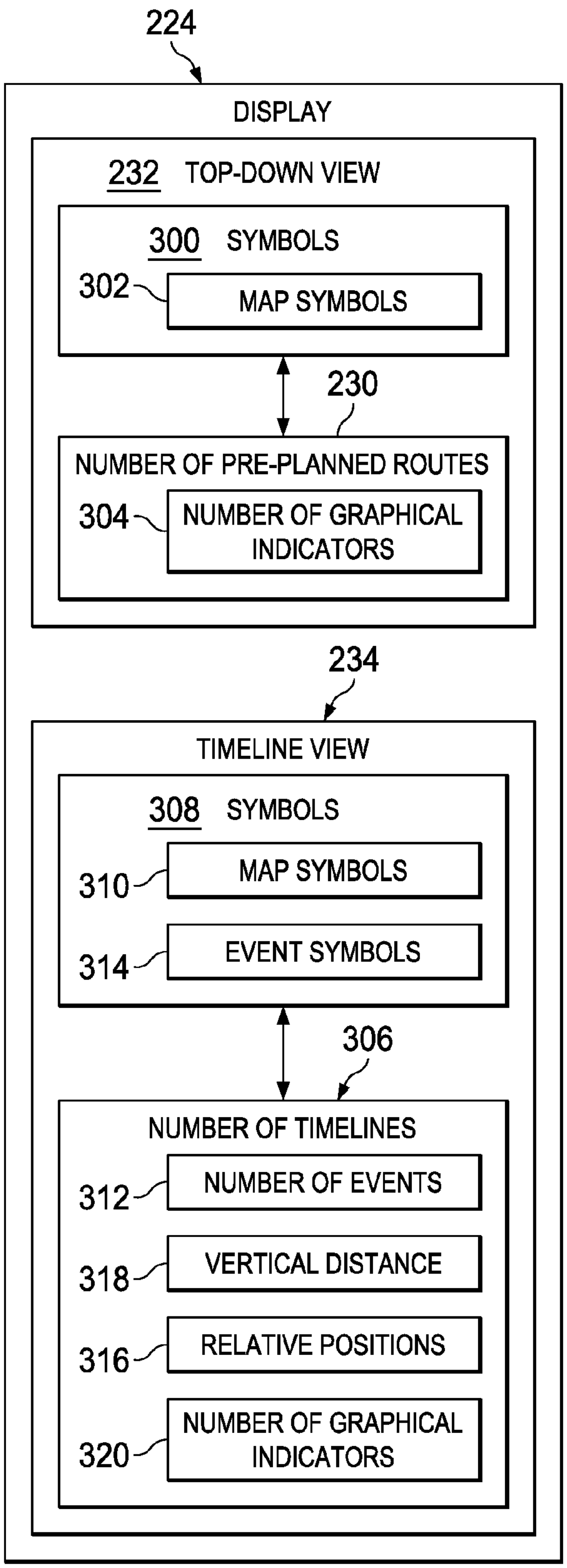
FIG. 3 is an illustration of a block diagram of a display for a display system in accordance with an illustrative embodiment.

Turning now to FIG. 3, an illustration of a block diagram of a display for a display system is depicted in accordance with an illustrative embodiment. As depicted, one configuration for display 224 is shown in this figure.

As depicted, display 224 includes top-down view 232 and timeline view 234. In top-down view 232, number of pre-planned routes 230 is displayed using symbols 300. Symbols 300 may be used to depict various forms of flight information 222 in FIG. 2. In these illustrative examples, symbols 300 take the form of map symbols 302. For example, map symbols 302 may represent information, such as, for example, without limitation, airports, navigation aids, airways, airspace boundaries, jet routes, altitude restrictions, waypoints, airspace information, and other suitable information.

In these illustrative examples, number of graphical indicators 304 is used to represent number of unmanned aerial vehicles 204 in FIG. 2. Number of graphical indicators 304 may be displayed in association with number of pre-planned routes 230 in a location that indicates the progress of number of unmanned aerial vehicles 204 along number of pre-planned routes 230 in top-down view 232.

Timeline view 234 includes number of timelines 306. In these illustrative examples, each timeline in number of timelines 306 is associated with an unmanned aerial vehicle in number of unmanned aerial vehicles 204. Number of timelines 306 displays flight information 222 with respect to time for number of unmanned aerial vehicles 204. In this illustrative example, number of timelines 306 is displayed in timeline view 234 using symbols 308. Symbols 308 used in number of timelines 306 are based on symbols 300 used in top-down view 232.

In these illustrative examples, symbols 308 include map symbols 310. Map symbols 310 may be some or all of map symbols 302 from symbols 300. In this manner, top-down view 232 is linked to timeline view 234 through the use of common symbols. This linking using common symbols between the views may aid an operator in more quickly understanding flight information 222 for number of unmanned aerial vehicles 204 as presented in top-down view 232 and timeline view 234.

In addition, timeline view 234 may also display number of events 312. Number of events 312 may not be displayed in top-down view 232. Number of events 312 may be displayed using event symbols 314 in symbols 308. As a result, symbols 308 also may include other symbols not used in symbols 300.

In these illustrative examples, number of events 312 may be identified from at least one of number of flight plans 228 in FIG. 2, an air traffic controller, and other suitable sources. Number of events 312 may be displayed on one or more of number of timelines 306. Additional symbols may be present for number of events 312. For example, without limitation, number of events 312 may be selected from at least one of hold, climb, take pictures, drop payload, drop flaps, raise flaps, lower landing gear, and other suitable types of events. A symbol may be selected for each of these types of events.

Additionally, number of timelines 306 also may be displayed in a manner to indicate relative positions 316 of number of unmanned aerial vehicles 204 along number of pre-planned routes 230. Relative positions 316 may be, for example, positions of one unmanned aerial vehicle at different points in time. In another illustrative example, relative positions 316 may be positions between different unmanned aerial vehicles.

For example, vertical distance 318 may be indicated on number of timelines 306. Vertical distance 318 for number of unmanned aerial vehicles 204 may be identified using number of timelines 306. Vertical distance 318 is a relative distance for number of unmanned aerial vehicles 204. Vertical distance 318 may be identified as relative changes occur in position for a single unmanned aerial vehicle in number of unmanned aerial vehicles 204. In other illustrative examples, vertical distance 318 may be identified as relative changes occur in position between multiple unmanned aerial vehicles in number of unmanned aerial vehicles 204.

Linking displaying of flight information 222 with respect to time for number of unmanned aerial vehicles 204 on number of timelines 306 in timeline view 234 with displaying top-down view 232 may also occur such that changes in number of pre-planned routes 230 displayed on top-down view 232 are reflected in number of timelines 306. For example, operator 206 in FIG. 2 may change number of pre-planned routes 230. Additionally, the progress of number of unmanned aerial vehicles 204 along number of pre-planned routes 230 in top-down view 232 also may be reflected in number of timelines 306 in timeline view 234.

For example, number of graphical indicators 320 may be displayed on number of timelines 306. Number of graphical indicators 320 represents number of unmanned aerial vehicles 204 in these illustrative examples. Number of graphical indicators 320 may be displayed in locations on number of timelines 306 to indicate progress of number of unmanned aerial vehicles 204.

The illustration of aircraft environment 200 in FIG. 2 and the components in aircraft environment 200 in FIG. 2 and FIG. 3 are not meant to imply physical or architectural limitations to the manner in which different illustrative embodiments may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the illustrative embodiments may be applied to other types of aircraft other than unmanned aerial vehicles. For example, aircraft control system 209 may be located in an aircraft, and operator 206 may be a pilot in the aircraft that manages the operation of the aircraft using top-down view 232 and timeline view 234. In still other illustrative examples, operator 206 may be an air traffic controller and may manage the flight of multiple aircraft. The air traffic controller may send instructions to the pilot of the aircraft based on flight information 222 using top-down view 232 and timeline view 234.

Figure 4:
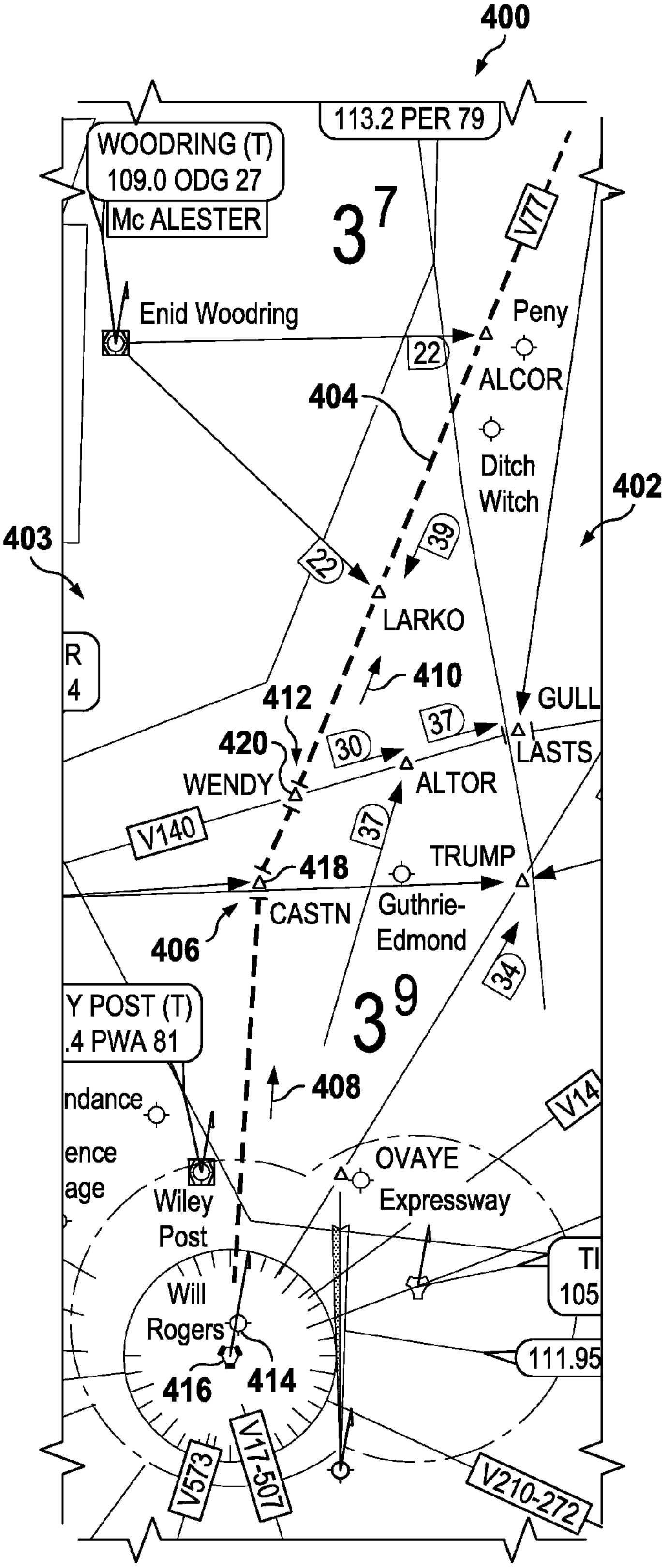
FIG. 4 is an illustration of a display of a top-down view of a route of an aircraft in accordance with an illustrative embodiment.

Turning now to FIG. 4, an illustration of a display of a top-down view of a route of an aircraft is depicted in accordance with an illustrative embodiment. In this illustrative example, display 400 is an example of one implementation for display 224 in FIG. 2. Top-down view 402 in display 400 is an example of one implementation for top-down view 232 in display 224 in FIG. 2.

As depicted, top-down view 402 in display 400 includes map 403. Route 404 is displayed on map 403. Route 404 is a pre-planned route in this illustrative example. As depicted, route 404 is displayed on map 403 using symbols 406.

In these illustrative examples, route 404 may be a flight path for an unmanned aerial vehicle traveling in the direction of arrow 408. As the aircraft continues to travel along route 404, the direction of travel may change. For example, the unmanned aerial vehicle may travel along route 404 in the direction of arrow 410 after climbing to a different altitude.

In these illustrative examples, symbols 406 include map symbols 412. Map symbols 412 may provide information about particular points along route 404. For example, without limitation, map symbols 412 may include a distance between two waypoints, a waypoint, a navigation aid, a flight trajectory, a geographic location, an airport, an intersection point with a route for another aircraft, an altitude, a total distance from a start point, or some other suitable map symbol.

In these illustrative examples, map symbols 412 include map symbol 414, map symbol 416, map symbol 418, and map symbol 420. Map symbol 414 may be a geographic indicator for an airport in these illustrative examples. Map symbol 416 is a navigation aid in close proximity to the airport in this illustrative example. Map symbol 418 and map symbol 420 may be symbols for other geographic indicators along the flight path for an aircraft traveling along route 404. Of course, other map symbols may be shown in display 400 other than map symbols 414, 416, 418, and 420. For example, a map symbol indicating a vector path, a magnetic heading, or a distance traveled along a particular route may be depicted.

Figure 5:
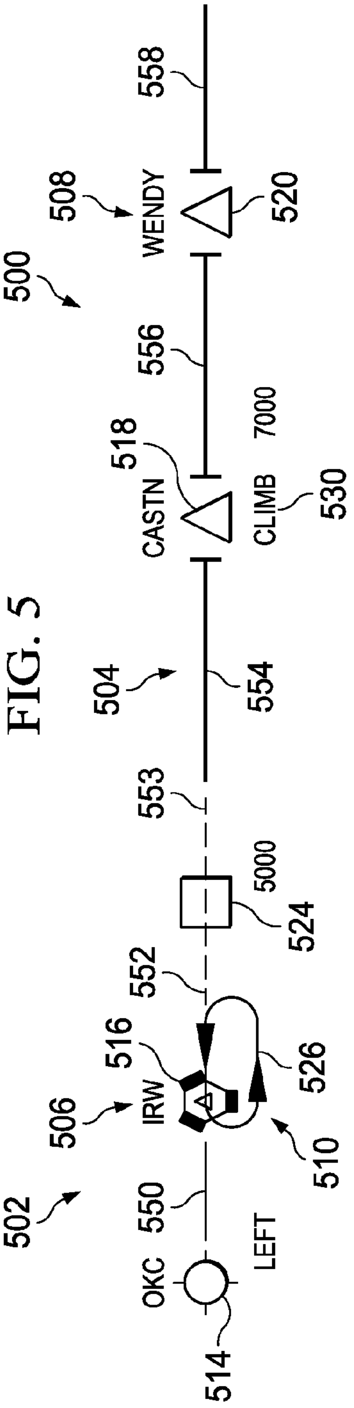
FIG. 5 is an illustration of a display of a timeline of an aircraft in accordance with an illustrative embodiment.

Turning now to FIG. 5, an illustration of a display of a timeline of an aircraft is depicted in accordance with an illustrative embodiment. In this illustrative example, display 500 is an example of one implementation for display 224 in FIG. 2. More specifically, timeline view 502 is an example of one implementation for timeline view 234 in display 224 in FIG. 2.

Timeline view 502 in display 500 depicts the flight of an aircraft along a route over different points in time. Particularly, timeline view 502 provides a timeline representation of route 404 from top-down view 402 in FIG. 4. Timeline view 502 depicts timeline 504 for an aircraft traveling along route 404 in FIG. 4.

In these illustrative examples, timeline view 502 includes symbols 506 along timeline 504. Symbols 506 are comprised of map symbols 508 and event symbols 510. As depicted, map symbols 508 correspond to map symbols 412 in FIG. 4.

Further, map symbols 508 depicted in timeline view 502 include map symbol 514, map symbol 516, map symbol 518, and map symbol 520. Map symbols 514, 516, 518, and 520 correspond to map symbols 414, 416, 418, and 420 in FIG. 4, respectively. Map symbols in map symbols 508 are placed on timeline 504. As the aircraft travels further along timeline 504, the relative position of map symbols 508 may change.

Additionally, events are depicted on timeline 504 using event symbols 510. Event symbols 510 provide operators of aircraft additional information about and instructions for flight. For example, an event symbol in event symbols 510 may represent an event, such as climb, descend, hold, or some other type of event.

Lines 550, 552, 554, 556, and 558 represent relative time between symbols 506 on timeline 504. The lengths of these lines provide relative times for travel from one location to another location as represented in map symbols 508, the time between events as indicated by event symbols 510, or a combination of the two.

In these illustrative examples, line 550 represents the time of travel between map symbol 514 and map symbol 516. Line 552 is dotted line 553, which represents the time of travel during the climb and hold maneuver at event symbol 526. Line 554 represents the relative time from the completion of the hold and climb event at event symbol 526 to map symbol 518. Line 556 represents the relative time between map symbol 518 and map symbol 520. Line 558 represents the time of travel between map symbol 520 and another map symbol in map symbols 508 (not shown).

As the operator of an aircraft traveling along timeline 504 changes one or more flight parameters, the distance between map symbols may increase or decrease, depending on the change in flight parameters. For example, if an operator increases the speed of the aircraft during the time of travel between map symbol 518 and map symbol 520, the relative time between these two points will decrease. As a result, the length of line 556 on timeline 504 will be shorter.

In this illustrative example, the flight begins at map symbol 514 and proceeds toward a navigation aid at map symbol 516. A hold and climb occurs at the navigation aid as indicated by event symbol 526. Dotted line 553 represents the time along timeline 504 that the aircraft performs the hold and climb maneuver. After the hold and climb is finished, the aircraft progresses along the current flight path to map symbol 518.

At map symbol 518, the aircraft then climbs as indicated by event symbol 530. At event symbol 530, the aircraft begins the climb at the time the aircraft reaches event symbol 530 without the need to hold. This climb is an en-route climb without a hold along line 556. The climb is completed along line 556.

In these illustrative examples, the progress of an unmanned aerial vehicle along timeline 504 may be identified using graphical indicator 524. Graphical indicator 524 takes the form of an icon that represents the unmanned aerial vehicle in this example. As time passes, graphical indicator 524 is moved along timeline 504 to indicate the progress of the unmanned aerial vehicle. In this illustrative example, graphical indicator 524 along timeline 504 corresponds to the aircraft flying in a location between map symbol 516 and map symbol 518.

In other illustrative examples of timeline 504, graphical indicator 524 may have a fixed position in display 500. In this example, graphical indicator 524 represents the position of the unmanned aerial vehicle at the current time. As time progresses, timeline 504 will shift relative to graphical indicator 524. For example, as an unmanned aerial vehicle flies along timeline 504 toward map symbol 520, the display of map symbol 520 in display 500 will move closer to graphical indicator 524. Once the unmanned aerial vehicle passes map symbol 520, map symbol 520 may no longer be displayed in timeline 504 in display 500.

In still other illustrative examples, map symbol 520 passed by the aircraft may be displayed before graphical indicator 524 in timeline 504. Map symbol 520 may be displayed for a period of time after the aircraft has passed map symbol 520. In this particular example, map symbol 520 may be grayed-out to symbolize a location that has been passed by the aircraft.

In this illustrative example, event symbol 526 is a symbol for a climb and hold event. When graphical indicator 524 moves along timeline 504 and reaches event symbol 526, the aircraft maintains a hold pattern while climbing. Dotted line 553 indicates the time used to complete the climb and hold event. When the climb and hold event is completed, line 554 symbolizes the flight of the aircraft as it travels further along route 404. In other words, during the time represented by dotted line 553, the aircraft is not traveling horizontally along route 404.

In these illustrative examples, event symbol 530 is a symbol for a climb event. Thus, when graphical indicator 524 reaches event symbol 530 along timeline 504, the aircraft will begin a climb to about 7,000 feet. In this example, event symbol 530 is aligned with map symbol 520. As a result, the aircraft begins to climb when the aircraft reaches map symbol 520, because the aircraft also reaches event symbol 530.

The illustration of map symbols 508 and event symbols 510 in timeline view 502 occur in substantially real time. As the aircraft travels along route 404, symbols 506 in timeline 504 change to depict the types of symbols related to a particular period of time. That period of time may be a pre-set period of time or changed by user input. For example, timeline view 502 may display timeline 504 for the entire duration of the flight of the aircraft along timeline 504. In another illustrative example, timeline view 502 may only display timeline 504 for about 10 minutes of flight.

Figure 6:
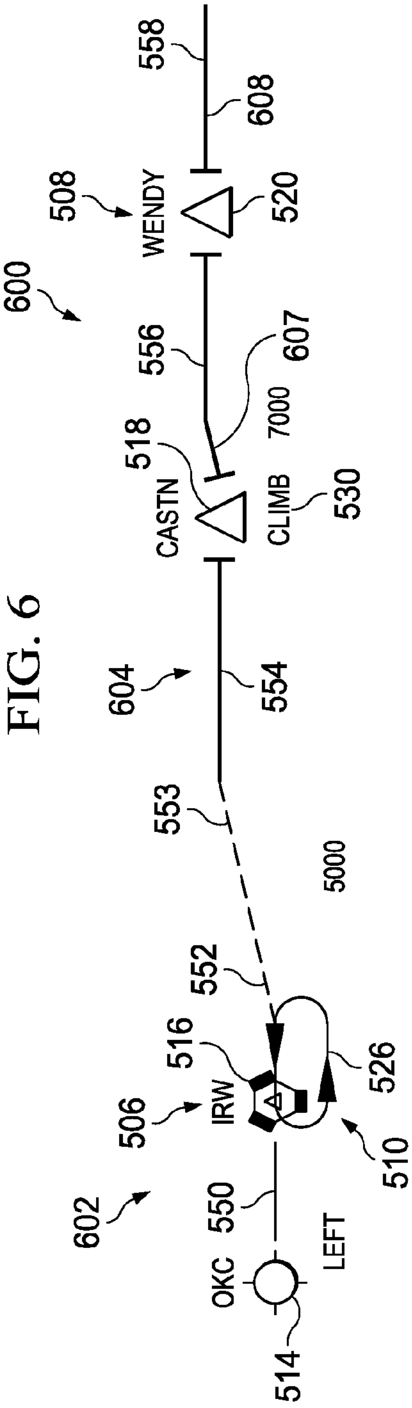
FIG. 6 is an illustration of another display of a timeline of an aircraft in accordance with an illustrative embodiment.

Turning now to FIG. 6, an illustration of another display of a timeline of an aircraft is depicted in accordance with an illustrative embodiment. In this illustrative example, timeline view 602 in display 600 may be another implementation for timeline view 234 in display 224 in FIG. 2. In this illustrative example, timeline 604 is depicted in timeline view 602. In this illustrative example, timeline 604 uses the same symbols as timeline 504 in FIG. 5. Timeline 604 is depicted such that the relative vertical distance is shown for the unmanned aerial vehicle at different points in time.

For example, lines 550, 552, 554, 556, and 558 along timeline 604 are graphically depicted such that the operator may see an additional view of the proposed climb at event symbol 526. In this illustrative example, more information about relative distances is provided to the viewer of timeline 604. For example, dotted line 553 is drawn at an angle relative to line 550 and line 554 to represent the relative vertical distance of the hold and climb indicated by event symbol 526. This relative vertical distance is between line 550 and line 552. The aircraft is at a higher altitude at line 554 than at line 550 in this particular example.

Similarly, the relative vertical distance traveled along line 556 with the climb indicated by event symbol 530 is also graphically depicted in this illustrative example. The solid line used for line 556 indicates that the aircraft is completing an en-route climb instead of a hold and climb maneuver. The relative vertical distance of travel may be depicted in a display for one aircraft or multiple aircraft in these illustrative examples.

Figure 7:
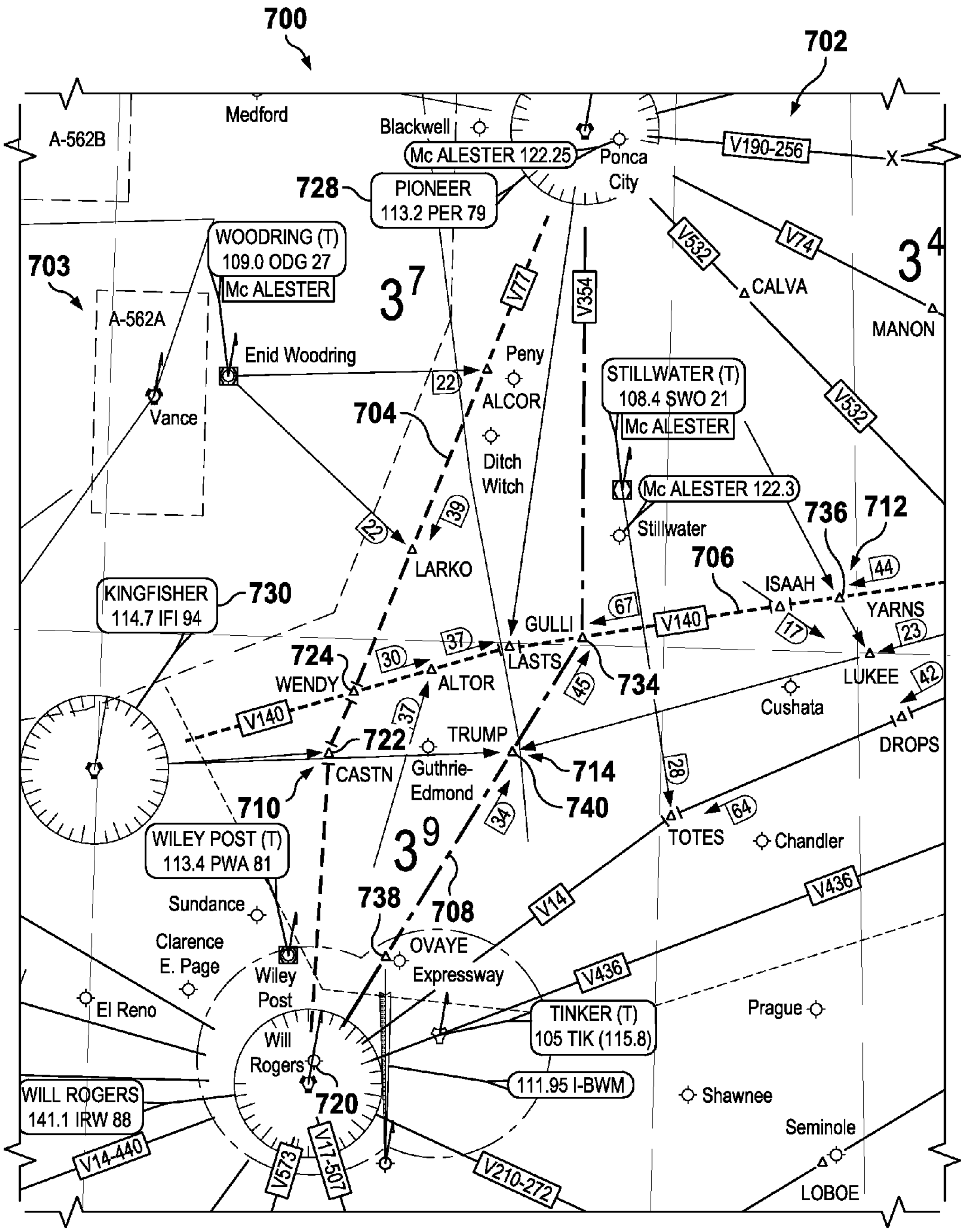
FIG. 7 is an illustration of a display of a top-down view of routes of multiple aircraft in accordance with an illustrative embodiment.

Turning now to FIG. 7, an illustration of a display of a top-down view of routes of multiple aircraft is depicted in accordance with an illustrative embodiment. In this illustrative example, display 700 with top-down view 702 is an example of an implementation for display 224 with top-down view 232 in FIG. 2.

As depicted, top-down view 702 may be map 703. Map 703 shows route 704, route 706, and route 708. In these illustrative examples, each route is a pre-planned route and represents a different unmanned aerial vehicle. As can be seen, these routes may intersect in these illustrative examples. The intersection of routes may occur at the same time or different times. Of course, top-down view 702 may be used to manage pre-planned routes for other types of aircraft other than unmanned aerial vehicles. Further, top-down view 702 may depict additional numbers of routes other than route 704, route 706, and route 708.

In this illustrative example, route 704 includes map symbols 710, route 706 includes map symbols 712, and route 708 includes map symbols 714. As depicted, map symbols 710 for route 704 include map symbol 720, map symbol 722, map symbol 724, and map symbol 728. Map symbols 712 for route 706 include map symbol 730, map symbol 724, map symbol 734, and map symbol 736. Map symbols 714 for route 708 include map symbol 738, map symbol 740, map symbol 734, and map symbol 728.

In these illustrative examples, route 704 may cross route 706 at a location indicated by map symbol 724. Further, route 706 may cross route 708 at another location indicated by map symbol 734. With the use of only top-down view 702, an operator may not know at what point in time these crossing of routes may occur. As a result, one route may cross another route at substantially the same time and risk an incursion.

Figure 8:
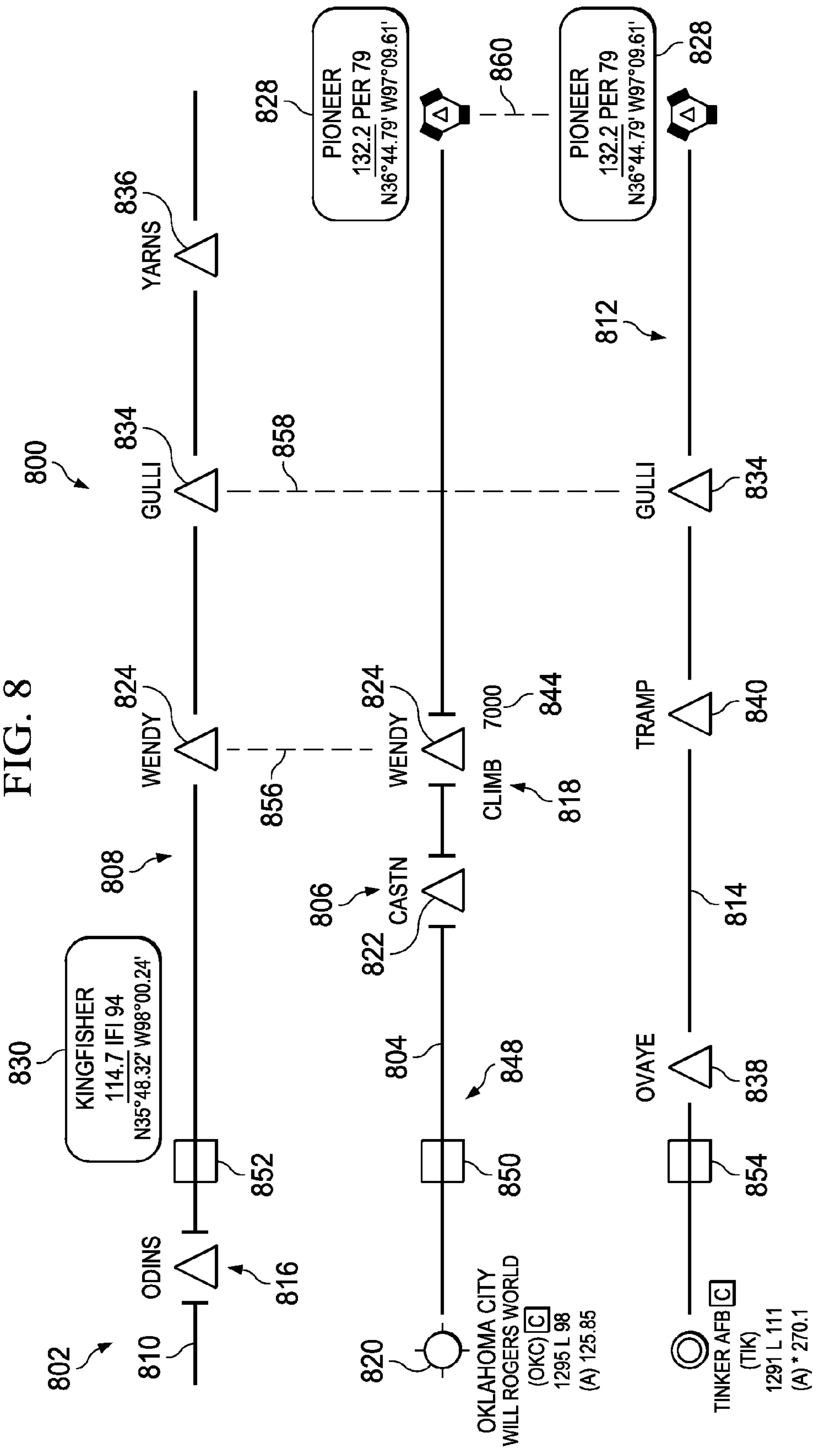
FIG. 8 is an illustration of a display of a timeline of multiple aircraft in accordance with an illustrative embodiment.

Turning now to FIG. 8, an illustration of a display of a timeline of multiple aircraft is depicted in accordance with an illustrative embodiment. In this illustrative example, display 800 includes timeline view 802. More specifically, display 800 with timeline view 802 is an example of one implementation of display 224 with timeline view 234 in FIG. 2.

In these illustrative examples, timeline view 802 includes symbols 806 along timeline 804, symbols 808 along timeline 810, and symbols 812 along timeline 814. Symbols 806, symbols 808, and symbols 812 are comprised of map symbols 816 and event symbols 818. As depicted, map symbols 816 correspond to map symbols 710, map symbols 712, and map symbols 714 in FIG. 7. Particularly, map symbols 720, 722, 724, and 728 along route 704 correspond to map symbols 820, 822, 824, and 828 on timeline 804; map symbols 730, 724, 734, and 736 along route 706 correspond to map symbols 830, 824, 834, and 836 on timeline 810; and map symbols 738, 740, 734, and 728 along route 708 correspond to map symbols 838, 840, 834, and 828 on timeline 814, respectively.

Event symbols 818 include event symbol 844. As depicted, when an aircraft flying along a route in timeline 804 reaches event symbol 844, the aircraft will climb about 7,000 feet. Graphical indicators 848 are used to indicate the progress of unmanned aerial vehicles along timelines 804, 810, and 814. For example, graphical indicator 850 is displayed on timeline 804. Graphical indicator 852 is displayed on timeline 810, and graphical indicator 854 is displayed on timeline 814. Alternatively, a line may be used to indicate progress along timelines 804, 810, and 814.

Additionally, timeline view 802 shows incursion indicator 856, incursion indicator 858, and incursion indicator 860 in display 800. An incursion is indicated when two unmanned aerial vehicles traveling along different timelines reach a location at substantially the same time. An incursion indicator is a graphical indicator indicating that two or more unmanned aerial vehicles may fly closer than desired to each other at a particular point in time. In these illustrative examples, incursion indicator 856 is shown when the trajectory of an aircraft traveling along timeline 804 and another aircraft traveling along timeline 810 result in these aircraft reaching the same location at substantially the same time.

In these illustrative examples, the position of graphical indicator 850 on timeline 804, graphical indicator 852 on timeline 810, and graphical indicator 854 on timeline 814 indicate how much time is left before an incursion may occur.

To prevent an incursion from occurring at incursion indicator 856, an operator managing the unmanned aerial vehicles may change one or more of the routes along which the unmanned aerial vehicles travel. The route may be changed such that one or more of the unmanned aerial vehicles changes speed, direction, altitude, or some combination thereof. If the changes are sufficient to avoid the upcoming incursion, the timeline display for one or both of the operators of unmanned aerial vehicles traveling along these timelines may update automatically. In this illustrative example, the unmanned aerial vehicle traveling along timeline 810 may slow down or speed up to avoid the incursion.

In these illustrative examples, incursion indicator 856, incursion indicator 858, and incursion indicator 860 are depicted having different levels of risk of the incursion. For example, the likelihood of an incursion at incursion indicator 856 of timeline 804 and timeline 810 indicates a higher risk than incursion indicator 858 of timeline 810 and timeline 814, because incursion indicator 856 is earlier in time than incursion indicator 858. In other illustrative examples, incursion indicator 856 may indicate a lower risk than incursion indicator 858 even though incursion indicator 856 may be earlier in time. For example, the level of separation may be less for the incursion indicated by incursion indicator 858 than for incursion indicator 856.

The levels of risk of incursion in these illustrative examples may be depicted using color, shading, line style, or other suitable types of graphical indicators. In one illustrative example, incursion indicator 856 may be red, while incursion indicator 858 may be yellow. In this example, red may indicate a higher level of risk than yellow.

The operator may change flight parameters to avoid or reduce the level of risk of incursion. For example, the operator may change at least one of air speed, altitude, bearing, and other flight parameters. As an operator of an unmanned aerial vehicle makes adjustments to flight parameters to avoid a potential incursion at incursion indicator 856, incursion indicator 856 may change color to represent a change in the risk of the incursion. The change of flight parameters may also affect the potential for incursion at incursion indicator 858. In other words, one or more of incursion indicator 856, incursion indicator 858, and incursion indicator 860 may change color in response to the same change in flight parameters.

In other illustrative examples, timeline view 802 in display 800 may update the display of symbols on timelines 804, 810, and 814 in response to changes in other conditions other than changes to the operation of the unmanned aerial vehicles. For example, without limitation, timeline view 802 may change based on weather conditions, wind, projected fuel burn, heading, altitude, terrain, fly-zone restrictions, or other suitable changes in the flight of aircraft in display 800. For example, the changes may change the time at which different map symbols, event symbols, or some combination thereof is reached. In other words, the distance between map symbols, event symbols, or some combination thereof may change to reflect changes in time as to when locations are reached and when events occurs.

The illustration of the displays with top-down views and timeline views in FIGS. 4-8 are only provided as illustrative examples of implementations for the displays and views. These depicted views are not meant to limit the manner in which the views may be displayed in other illustrative embodiments. For example, in some illustrative embodiments, a single graphical indicator may be used to indicate the progress of unmanned aerial vehicles along timelines. In another illustrative example, timelines may be arranged vertically rather than horizontally.

In yet other illustrative examples, no graphical indicators may be used behind the present position of the aircraft. Rather, progress in a display is shown by the view of the remaining route depicted on the display. In other words, an operator may only see what is ahead of the aircraft along the timeline.

In another illustrative example, incursion indicators may be located along lines on the timeline and not on symbols on the timeline. Incursion indicators may indicate a time not represented by a map symbol on the timeline where aircraft may be separated by a distance that is less than desired.

Further, the different illustrative embodiments in FIGS. 4-8 may be used together to provide the operator of an aircraft in a display valuable information about the flight of the aircraft. For example, the timeline views in FIG. 5 and FIG. 6 may be used with the top-down view in FIG. 4, while the top-down view in FIG. 7 and the timeline view in FIG. 8 may be used together.

Figure 9:
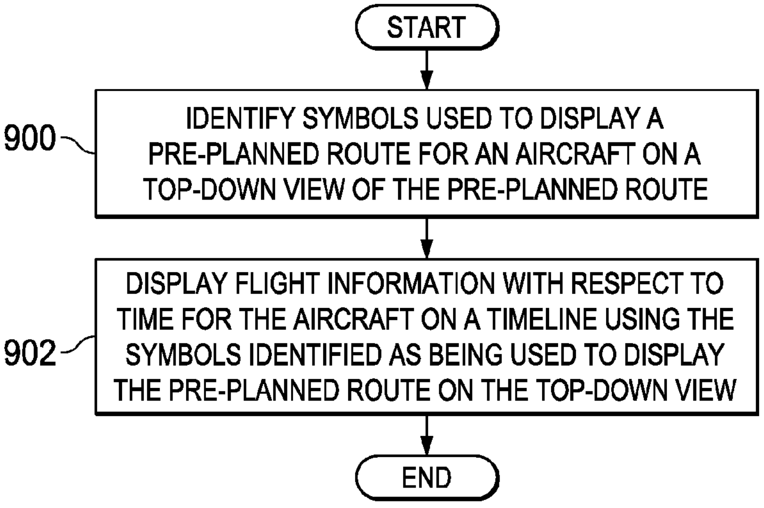
FIG. 9 is an illustration of a flowchart of a process for displaying information for operating an aircraft in accordance with an illustrative embodiment.

Turning now to FIG. 9, an illustration of a flowchart of a process for displaying information for operating an aircraft is depicted in accordance with an illustrative embodiment. The process illustrated in FIG. 9 may be implemented in navigation system 212 in FIG. 2.

The process begins by identifying symbols used to display a pre-planned route for an aircraft on a top-down view of the pre-planned route (operation 900). The process then displays flight information with respect to time for the aircraft on a timeline using the symbols identified as being used to display the pre-planned route on the top-down view (operation 902), with the process terminating thereafter.

Figure 10:
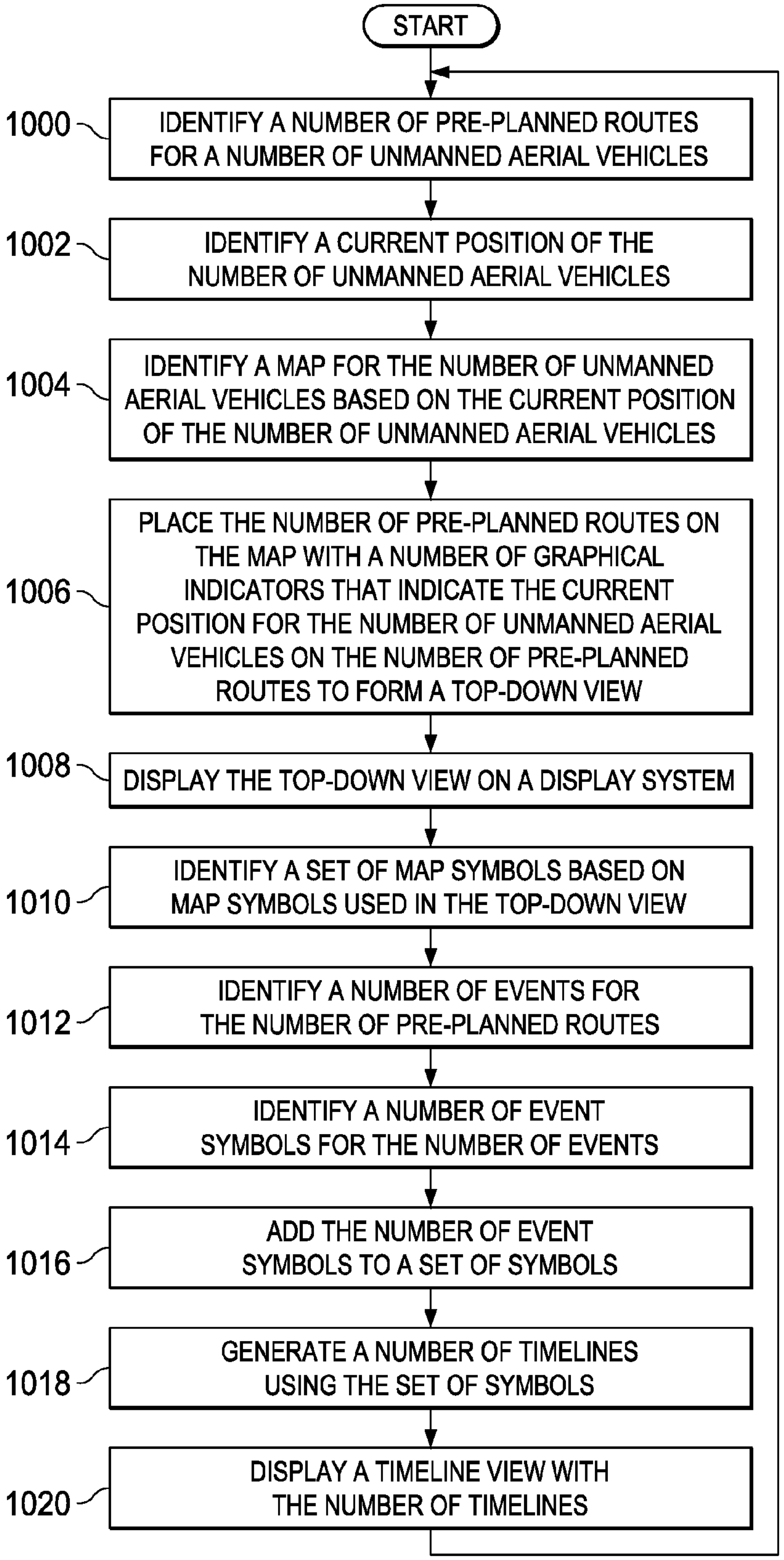
FIG. 10 is an illustration of a flowchart of a process for assisting the management of a number of unmanned aerial vehicles in accordance with an illustrative embodiment.

With reference now to FIG. 10, an illustration of a flowchart of a process for assisting the management of a number of unmanned aerial vehicles is depicted in accordance with an illustrative embodiment. The process illustrated in FIG. 10 may be implemented in navigation system 212 in FIG. 2.

The process begins by identifying a number of pre-planned routes for a number of unmanned aerial vehicles (operation 1000). The process then identifies a current position of the number of unmanned aerial vehicles (operation 1002). The process then identifies a map for the number of unmanned aerial vehicles based on the current position of the number of unmanned aerial vehicles (operation 1004).

The process then places the number of pre-planned routes on the map with a number of graphical indicators that indicate the current position for the number of unmanned aerial vehicles on the number of pre-planned routes to form a top-down view (operation 1006). The process then displays the top-down view on a display system (operation 1008).

The process identifies a set of map symbols based on map symbols used in the top-down view (operation 1010). The process identifies a number of events for the number of pre-planned routes (operation 1012). The process then identifies a number of event symbols for the number of events (operation 1014). These events may be identified from a number of flight plans for the number of unmanned aerial vehicles. The number of event symbols is added to a set of symbols (operation 1016). In operation 1016, the set of symbols includes both map symbols and event symbols.

The process then generates a number of timelines using the set of symbols (operation 1018). A number of graphical indicators are placed on the number of timelines in which the number of graphical indicators indicates the progress of the number of unmanned aerial vehicles on the number of timelines. For example, the number of graphical indicators may include a graphical indicator on each timeline that is aligned with the other graphical indicators on the other timelines. In another example, a single graphical indicator may extend through all of the timelines. The process then displays a timeline view with the number of timelines (operation 1020), with the process returning to operation 1000. When returning to operation 1000, changes to the number of pre-planned routes, if any, may be identified.

Figure 11:
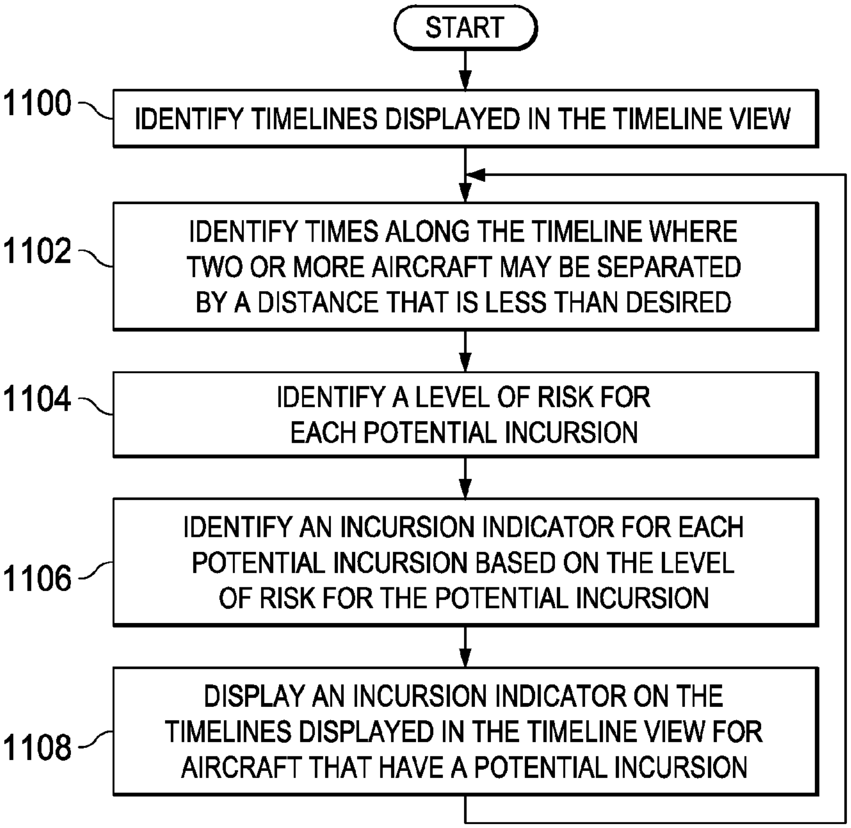
FIG. 11 is an illustration of a flowchart of a process for indicating potential incursions in accordance with an illustrative embodiment.

With reference to FIG. 11, an illustration of a flowchart of a process for indicating potential incursions is depicted in accordance with an illustrative embodiment. The process illustrated in FIG. 11 may be implemented in navigation system 212 in FIG. 2.

The process begins by identifying timelines displayed in the timeline view (operation 1100). The timelines are timelines managed by an operator in these illustrative examples. For example, the timelines may be for unmanned aerial vehicles managed by a pilot. In another example, the timelines may be for aircraft managed by an air traffic controller.

The process identifies times along the timeline where two or more aircraft may be separated by a distance that is less than desired (operation 1102). The process then identifies a level of risk for each potential incursion (operation 1104). An incursion indicator is identified for each potential incursion based on the level of risk for the potential incursion (operation 1106).

The process displays an incursion indicator on the timelines displayed in the timeline view for aircraft that have a potential incursion (operation 1108), with the process then returning to operation 1102. The aircraft with potential incursions may change as flight parameters for operating the aircraft change. These changes may be made by the operator of the aircraft to reduce the level of risk of incursion or remove the potential incursion. With these changes, the display of incursion indicators displayed on the timelines change.

Figure 12:
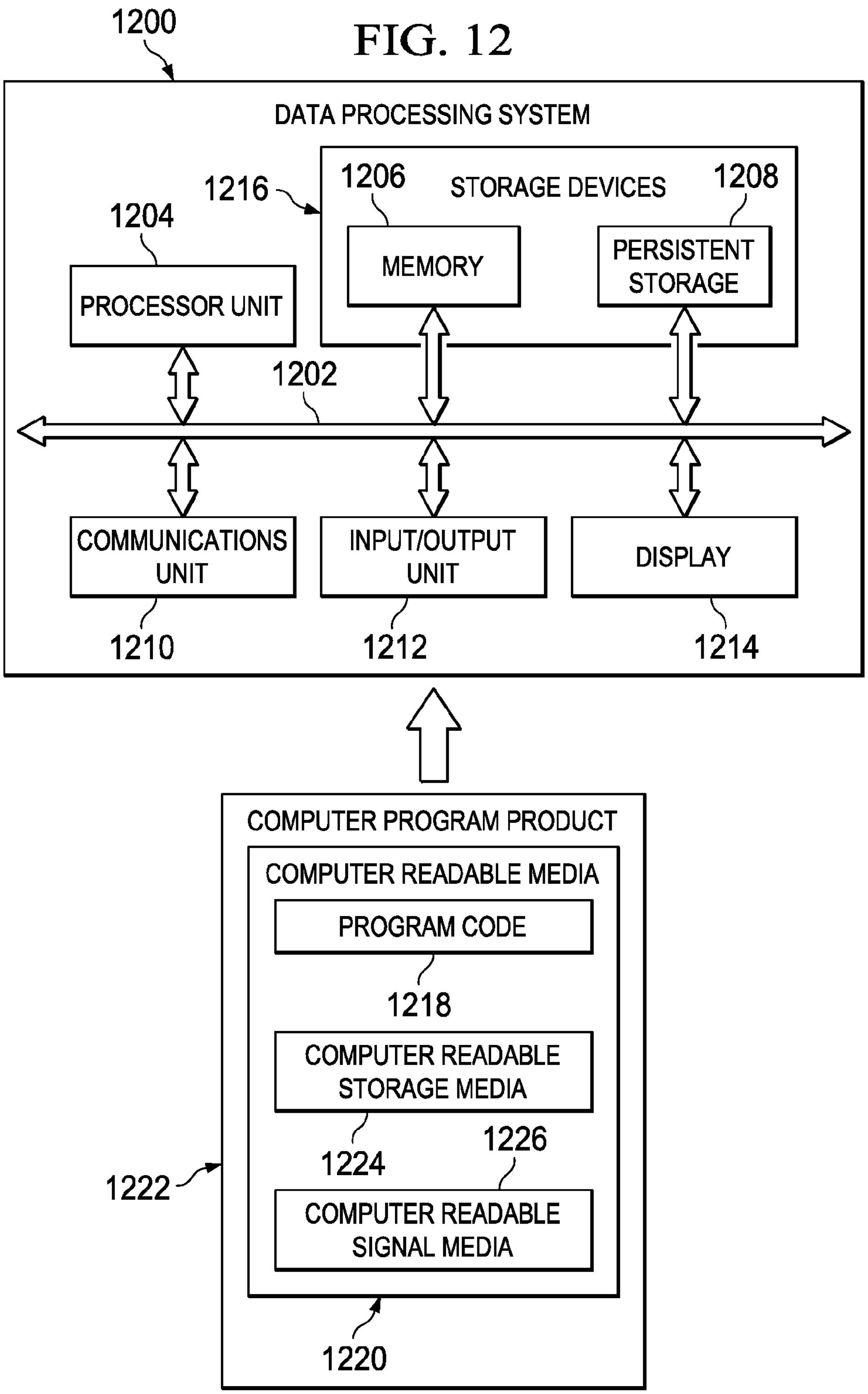
FIG. 12 is an illustration of a data processing system in accordance with an illustrative embodiment.

Turning now to FIG. 12, an illustration of a data processing system is depicted in accordance with an illustrative embodiment. Data processing system 1200 may be used to implement computer system 214 in FIG. 2. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer readable storage devices in these illustrative examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these illustrative examples. In one example, computer readable media 1220 may be computer readable storage media 1224 or computer readable signal media 1226. In these illustrative examples, computer readable storage media 1224 is a physical or tangible storage device used to store program code 1218 rather than a medium that propagates or transmits program code 1218.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1200 are not meant to provide architectural limitations to the manner in which different embodiments may be implemented. The different illustrative embodiments may be implemented in a data processing system including components in addition to and/or in place of those illustrated for data processing system 1200. Other components shown in FIG. 12 can be varied from the illustrative examples shown. The different embodiments may be implemented using any hardware device or system capable of running program code 1218.

Thus, the illustrative embodiments provide a method and apparatus for assisting an operator in managing the operation of aircraft. In particular, the illustrative embodiments may be applied to managing unmanned aerial vehicles. Flight information for unmanned aerial vehicles is presented on a timeline using symbols from a top-down view. The commonality of symbols between the top-down view and the timeline view assists the operator in more quickly viewing flight information displayed on these views. In this manner, an operator may manage unmanned aerial vehicles with less fatigue, manage more unmanned aerial vehicles at the same time, perform other operations, or some combination thereof.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for assisting in management of a number of unmanned aerial vehicles, the method comprising:

identifying symbols used to display a number of pre-planned routes for the number of unmanned aerial vehicles on a top-down view of the number of pre-planned routes, wherein the symbols include map symbols and event symbols, the map symbols represent each of the number of unmanned aerial vehicles, and the event symbols represent types of events of the number of unmanned aerial vehicles that correspond to the number of pre-planned routes; and displaying, in a timeline view, flight information with respect to time for the number of unmanned aerial vehicles on a number of timelines using the symbols identified as being used to display the number of pre-planned routes for the number of unmanned aerial vehicles on the top-down view of the number of pre-planned routes, wherein the number of timelines are displayed parallel to each other in the timeline view and each comprise line segments representing amounts of time passing between the events of the number of unmanned aerial vehicles.

2. The method of claim 1, wherein the number of timelines is two or more timelines, and further comprising:

displaying, in the timeline view, an event on each of the two or more timelines for the number of unmanned aerial vehicles.

3. The method of claim 1, wherein the types of events represented by the event symbols are selected from one of hold, climb, take pictures, drop payload, drop flaps, raise flaps, and extend landing gear.

4. The method of claim 1 further comprising:

displaying the top-down view of the number of pre-planned routes.

5. The method of claim 1, wherein the number of timelines is displayed in the timeline view in a manner that indicates relative positions of the number of unmanned aerial vehicles to each other along the number of pre-planned routes.

6. The method of claim 1 further comprising:

displaying, in the timeline view, a number of graphical indicators on the number of timelines, wherein the number of graphical indicators indicate a progress of the number of unmanned aerial vehicles on the number of timelines.

7. The method of claim 1 further comprising:

displaying, in the timeline view, an incursion indicator for an incursion between the number of unmanned aerial vehicles on the number of timelines.

8. The method of claim 1 further comprising:

managing an operation of the number of unmanned aerial vehicles.

9. The method of claim 8, wherein managing the operation of the number of unmanned aerial vehicles comprises:

re-routing a portion of the number of unmanned aerial vehicles.

10. A method for displaying information for operating an aircraft, the method comprising:

Identifying symbols used to display a pre-planned route for the aircraft on a top-down view of the pre-planned route, wherein the symbols include a map symbol and event symbols, the map symbol represent the aircraft, and the event symbols represent types of events of the aircraft that correspond to the pre-planned route; and Displaying, in a timeline view, flight information with respect to time for the aircraft on a timeline using the symbols identified as being used to display the pre-planned route for the aircraft on the top-down view, wherein the timeline displayed in the timeline view is a horizontal timeline that comprises line segments representing amounts of time passing between the events of the aircraft;

Wherein, the symbols are first symbols, the pre-planned route is a first pre-planned route, and further comprising:

Identifying second symbols used to display a second pre-planned route for a second aircraft on the top-down view of the pre-planned route; and Displaying, in the timeline view, the flight information with respect to time for the second aircraft on a second timeline using the second symbols identified as being used to display the second pre-planned route for the second aircraft on the top-down view of the second pre-planned route.

11. The method of claim 10 further comprising:

displaying, in the timeline view, an event on the timeline for the aircraft.

12. The method of claim 10 further comprising:

displaying the top-down view of the route.

13. An apparatus comprising:

a display system; and a navigation system configured to identify symbols used to display a number of pre-planned routes for a number of unmanned aerial vehicles on a top-down view of the number of pre-planned routes and display, in a timeline view, flight information with respect to time for the number of unmanned aerial vehicles on a number of timelines using the symbols identified as being used to display the number of pre-planned routes for the number of unmanned aerial vehicles on the top-down view of the number of pre-planned routes, wherein the symbols include map symbols and event symbols, the map symbols represent each of the number of unmanned aerial vehicles, the event symbols represent types of events of the number of unmanned aerial vehicles that correspond to the number of pre-planned routes, and the number of timelines displayed in the timeline view are displayed parallel to each other in the timeline view and each comprise line segments representing amounts of time passing between the events of the number of unmanned aerial vehicles.

14. The apparatus of claim 13, wherein the number of timelines is two or more timelines, and the navigation system is further configured to display, in the timeline view, an event on each of the two or more timelines for the number of unmanned aerial vehicles.

15. The apparatus of claim 13, wherein the navigation system is further configured to display the top-down view of the number of pre-planned routes.

16. The apparatus of claim 15, wherein the navigation system is further configured to display, in the timeline view, the flight information with respect to the time for the number of unmanned aerial vehicles on the number of timelines with displaying the top-down view of the number of pre-planned routes, such that changes in the number of pre-planned routes displayed on the top-down view are reflected in the number of timelines.

17. The apparatus of claim 13, wherein the number of timelines is displayed in the timeline view in a manner that indicates a number of relative positions of the number of unmanned aerial vehicles to each other along the number of pre-planned routes.

18. The apparatus of claim 13, wherein the navigation system is further configured to display, in the timeline view, a number of graphical indicators on the number of timelines, wherein the number of graphical indicators indicate a progress of the number of unmanned aerial vehicles on the number of timelines.

19. The apparatus of claim 13, wherein the navigation system is further configured to display, in the timeline view, an incursion indicator for at least one of an incursion and a potential incursion between the number of unmanned aerial vehicles on the number of timelines.

* * * * *